United States Patent [19]

Misra

[11] Patent Number: 5,623,414
[45] Date of Patent: Apr. 22, 1997

[54] CLOCK-AIDED SATELLITE NAVIGATION RECEIVER SYSTEM FOR ENHANCED POSITION ESTIMATION AND INTEGRITY MONITORING

[76] Inventor: Pratap N. Misra, 27 Hop Brook La., Sudbury, Mass. 01776

[21] Appl. No.: 377,413

[22] Filed: Jan. 24, 1995

[51] Int. Cl.$^6$ .......................... H04B 7/185; G06F 19/00
[52] U.S. Cl. ...................... 364/449.1; 342/357; 342/358; 364/449.7
[58] Field of Search .................................. 364/443, 449, 364/454, 459; 342/352, 357, 358, 417

[56] References Cited

U.S. PATENT DOCUMENTS

| | | | |
|---|---|---|---|
| 4,578,678 | 3/1986 | Hurd | 343/357 |
| 4,689,626 | 8/1987 | Hori et al. | 342/357 |
| 4,918,609 | 4/1990 | Yamawaki | 342/357 |
| 4,928,106 | 5/1990 | Ashjaee et al. | 342/352 |
| 5,153,599 | 10/1992 | Harigae et al. | 342/352 |
| 5,225,842 | 7/1993 | Brown et al. | 342/357 |
| 5,293,170 | 3/1994 | Lorenz et al. | 342/352 |
| 5,319,374 | 6/1994 | Desai et al. | 342/357 |
| 5,436,632 | 7/1995 | Sheynblat | 342/357 |
| 5,440,313 | 8/1995 | Osterdock et al. | 342/352 |
| 5,440,491 | 8/1995 | Kawano et al. | 342/357 |
| 5,483,456 | 1/1996 | Kuwahara et al. | 342/357 |
| 5,490,076 | 2/1996 | Rawicz et al. | 342/358 |
| 5,506,781 | 4/1996 | Cummiskey et al. | 342/358 |

OTHER PUBLICATIONS

Milliken, R.J., et al, "Principle of Operation of NAVSTAR and System Characteristics", *Global Positioning System*, pp.3–14, (1980).

Lee, Young C., Analysis of RAIM Function Availability for GPS Augmented with Barometric Altimeter Aiding and Clock Costing, pp.1–14 (1992).

Pratap N. Misra et al., "Role of the Clock in a GPS Navigation Receiver", *MIT Lincoln Laboratory*, May 1994.

Pratap N. Misra et al., "Clock–Aided RAIM for WAAS: Category I Precision Approaches", *MIT Lincoln Laboratory*, Nov. 1994.

Sturza, "GPS Navigation Using Three Satellites and a Precise Clock", *Litton Aero Products*, Mar. 1993.

McBurney et al., "Receiver Clock Stability: An Important Aid in the GPS Integrity Problem", *Proceedings of the ION National Technical Meeting*, Jan. 1988.

Knable et al., "Clock Coasting and Alimeter Error Analysis for GPS", *Proceedings of the ION National Technical Meeting*, 1984.

Primary Examiner—Gary Chin
Attorney, Agent, or Firm—Testa, Hurwitz & Thibeault, LLP

[57] ABSTRACT

A satellite navigation receiver system for determining an accurate three dimensional position estimate of a movable object and initiating correction of the location of the movable object in response to the three dimensional estimate, utilizing a receiver for receiving range measurement signals from a satellite navigation system, a clock having a constant frequency drift rate for at least a predetermined period of time, and a processing scheme capable of computing clock bias estimates over a predetermined period of time including an instantaneous time, using the clock bias estimates in a quadratic function to adaptively derive a smoothed clock bias estimates over the predetermined period of time including the instantaneous time, computing a three dimensional position estimate of the movable object's position using the smoothed clock bias estimate at the instantaneous time, and determining if the three dimensional position estimates are of sufficient quality for a user's intended purpose, whereby depending on the computed three dimensional position estimates, alone or in conjunction with the determination as to whether such estimates are of sufficient quality, the movable object is moved in response thereto.

22 Claims, 9 Drawing Sheets

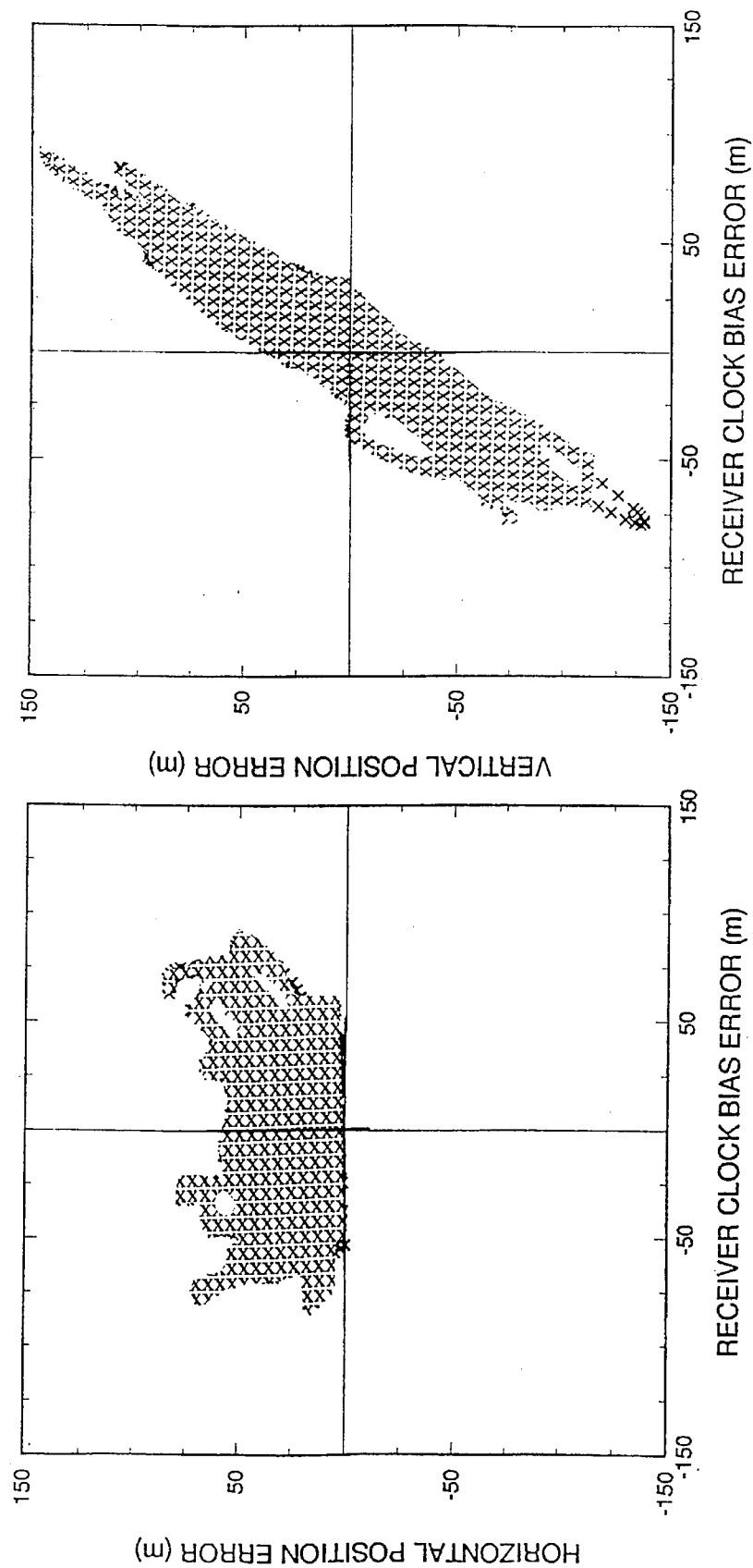

RECEIVER CLOCK BIAS ERROR (m)

RECEIVER CLOCK BIAS ERROR (m)

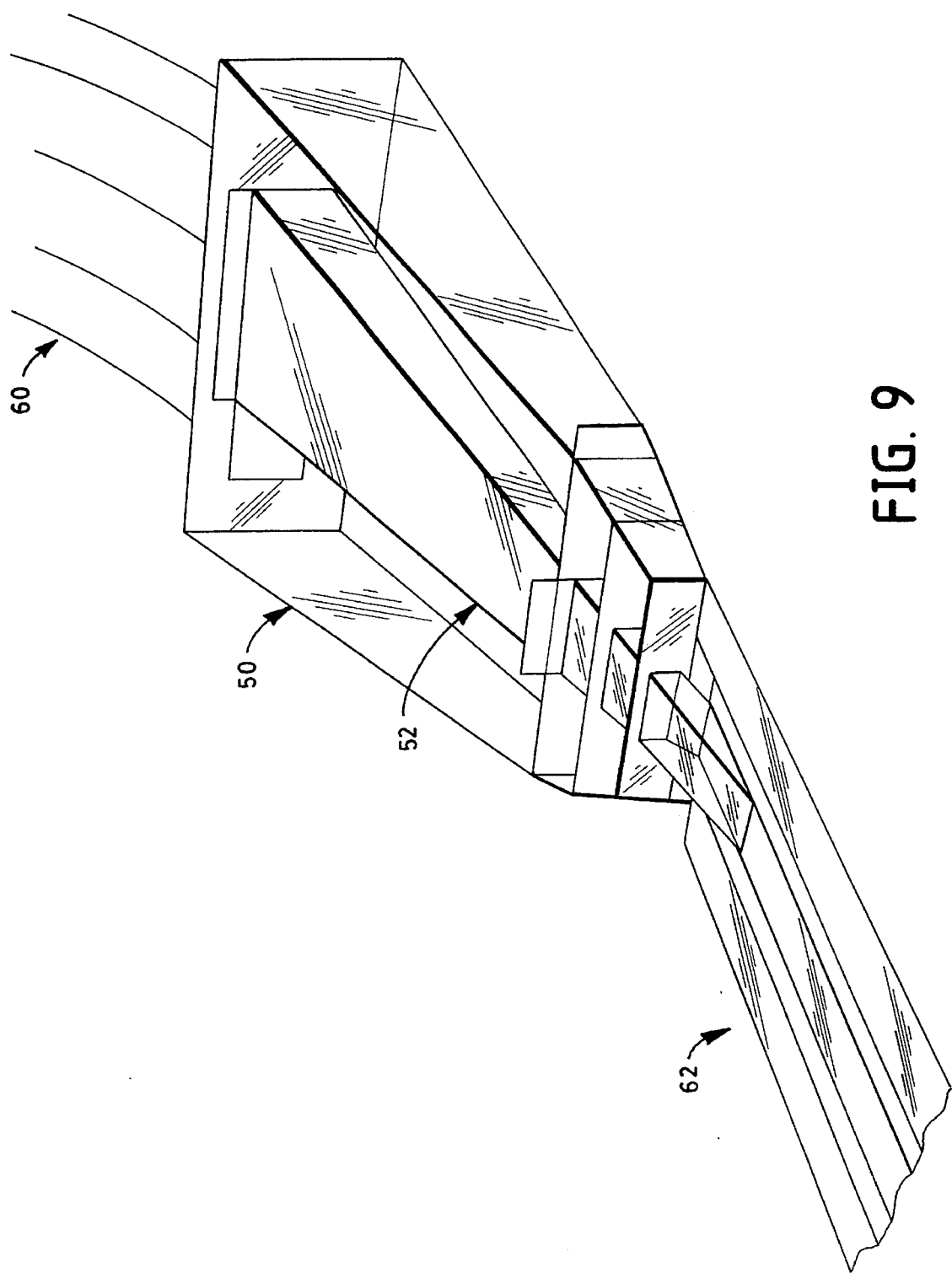

CLOCK-AIDED SATELLITE NAVIGATION RECEIVER SYSTEM FOR ENHANCED POSITION ESTIMATION AND INTEGRITY MONITORING

STATEMENT OF FEDERALLY SPONSORED RESEARCH

This invention was made with government support under contract no. DTFA01-89-Z-02030 awarded by the FAA and contract no. F19628-95-C-0002 awarded by the U.S. Air Force. The U.S. government has certain rights in the invention.

FIELD OF THE INVENTION

This invention relates to a clock-aided satellite navigation receiver system for determining position estimates of a movable object, as well as providing a measure of the accuracy of the position estimates.

BACKGROUND OF THE INVENTION

Global navigation satellite systems GPS and GLONASS, now being deployed in the United States and Russia, represent a revolutionary change in navigation and positioning technology. Other such systems will likely follow, which will be applicable to all forms of travel. One of the areas affected profoundly by the availability of satellite based navigation (SatNav) is civil aviation, where these systems show an enormous promise for enhancing economy as well as safety. Airports of the future will likely be equipped with local-area differential GPS, as well as wide-area differential GPS, particularly Wide Area Augmentations System (WAAS). Planning is underway in the U.S. to switch to GPS-based navigation and surveillance in all phases of flight including precision approaches.

Precision approaches, carried out under poor visibility conditions, require navigational guidance both horizontally and vertically, and place stringent requirements on the accuracy of position estimates. Vertical guidance, in particular is of critical importance. Currently, precision approaches require local instrumentation, such as Instrument Landing System (ILS), and the Microwave Landing System (MLS), installed at each runway to provide navigational guidance to suitably equipped aircraft. The ILS and MLS are expected to be phased out in favor of satellite navigation. In the future, precision approaches using satellite navigation will use GPS in either differential mode, local mode, or wide area mode. The latter of such may be Wide Area Augmentation System (WAAS), which is planned to provide such capability over conterminous U.S. by the year 2000. Satellite navigation systems however, are thought to offer significantly better horizontal than vertical position estimates. Thus, an important challenge in the industry is to provide systems with enhanced vertical position accuracy.

Precision approaches under a Category I standard used internationally require horizontal and vertical navigational guidance down to an altitude (or "decision height") of 200 feet above the touchdown area. If the runway is in view when the plane reaches a decision height the pilot may land using the visual references for navigation. The decision heights for Category II and Category III standards are significantly lower.

The deviation from a pre-defined flight path allowed an aircraft while being guided by a navigation system for a precision approach is strictly limited. As expected, the permissible deviation, called an alarm limit, changes with aircraft altitude. Thus, the closer the aircraft gets to touchdown, the less deviation allowed. Alarm limits are specified for both horizontal and vertical errors at each altitude. If at any point during an approach the aircraft deviation from the prescribed flight path exceeds the alarm limit, the pilot is warned promptly and the approach is aborted. Insofar as the aircraft position can only be estimated using satellite navigation, there will be some uncertainty associated with it. In order to ensure that the aircraft doesn't violate an alarm limit, the navigation system must be required to deliver position estimates of assured accuracy. The lower the aircraft altitude, the lower the deviation alarm limit, and the lower the error tolerable in the position estimate. If a position estimate cannot be assured by the navigation system to meet the current requirement on its accuracy, the pilot is warned. This function of ensuring that the quality of a position estimate is acceptable is referred to as integrity monitoring.

Conventional methods of integrity monitoring have operated under the premise that, if assured of system integrity each user could count on obtaining a position estimate of a certain quality. This premise, however, does not hold for satellite navigation in general. For example, different users of a satellite navigation system may obtain position estimates of significantly different qualities. Thus, in adopting satellite navigation for civil aviation, an important issue to be resolved is providing the user (e.g., the pilot of an aircraft in this scenario) with a system capable of recognizing if a position estimate is good enough for a precision approach. This is even more important in the industry considering that conventional receivers often provide poor vertical position estimates.

Generally, the quality of position estimates obtained by different users of a satellite navigation system vary greatly. Conventional receivers operating with satellite navigation systems measure the transit time of the signal and decipher the data to determine the satellite position. Given that the distance from a satellite to the receiver is determined by the speed of light multiplied by the signal travel time, it is important that time measurement be characterized accurately. For example, if the satellite clock and the receiver clock were out of sync by even 0.001 second, the measurement of distance from the satellite to the receiver would be off by 1,860 miles. If receiver clocks were perfectly synchronized with the satellite clocks, only three measurements (x,y,z) of range to satellites would be needed to allow a user to compute a three-dimensional position. This process is known as mulitlateration. However, given the expense in providing a receiver clock whose time is exactly synchronized, a way to account for receiver clock bias has been to compute a measurement from a fourth satellite. This is done by a processor in the receiver which correlates the ranges measured from each satellite to where they intersect. If a series of measurements do not intersect, the processor either subtracts or adds time from all of the measurements, continuing to do so until it reaches a three-dimensional position estimate where all range estimates intersect. This is carried out by the use of basic trigonometry, usually four equations with four unknowns x,y,z,b. The amount b, by which the processor has added or subtracted time to achieve this intersection, is the bias between the receiver clock and the satellite clock.

Having measurements obtained from four satellites in view, however, does not assure a good position estimate. The biased range measurements are called pseudoranges. Estimation of the four unknowns, x, y, z, b where b is the clock bias estimate, are referred to as 4-D estimations. The quality of a position estimate depends upon two factors: (1) the number of satellites in view and their spatial distribution relative to the user, and (2) the quality of the "pseudorange measurements". Satellite geometry is characterized by a parameter called "Dilution of Precision" (DOP). This parameter, DOP, can be thought of as roughly inversely proportional to the volume of a polyhedron with the receiver being at the apex and the satellite positions defining the base. The pseudorange measurements are range measurements which contain errors, thus the quality of pseudorange measurements is characterized by their rms error. There are several sources of error which affect range measurements including errors in the predicted ephemeris of the satellites, instabilities in the satellite and receiver clocks, ionospheric and tropospheric propagation delays, multipath, and receiver noise. Further errors in position estimates may be the result of the effects of an undetected or an unannounced system malfunction. The collective effect of these errors is referred to as the User Range Error (URE) and its rms value is $\alpha URE$. The position error is thus expressed in terms of these two factors: RMS position error=(DOP)($\alpha URE$). In order for satellite navigation to be used globally, all users must have in view at least four satellites geometrically positioned for accuracy as well as a URE such that the resulting position estimate meets the user's requirement. As stated above, Category I approaches determine a range within which an aircraft must stay when performing a precision approach.

Known systems generally cannot provide each user with the ability to accurately determine on the basis of satellite measurements when a position estimate meets accuracy requirements, and when it does not. Characterization of the accuracy of a position estimate in terms of the measurements themselves is referred to as receiver autonomous integrity monitoring. Currently, however, methods of integrity monitoring rely on inaccurate vertical position estimates obtained by conventional receivers. Some work in the area of developing methods of receiver autonomous integrity monitoring has dealt with guarding against measurement anomalies due to satellite malfunctions only, which is a factor responsible for introducing large errors in position estimates. Unfortunately, these methods require redundant measurements and can deal effectively only with one anomalous measurement. If multiple anomalies arose, these methods of integrity monitoring would fail to detect the problem and provide such detection to the user.

The instant invention overcomes the problems of obtaining accurate vertical position estimates, and providing the user with an indication as to the accuracy of the vertical position measurement for an intended purpose, notwithstanding the degree of error or the number of anomalies effecting the error.

SUMMARY OF THE INVENTION

It is an object of the invention to provide a clock-aided satellite navigation receiver system for producing accurate position estimates of an object.

It is an object of the invention to utilize a stable receiver clock to improve position estimates during satellite navigation.

It is another object of the invention to increase the accuracy of vertical position estimates available from a satellite navigation system.

It is yet another object of the invention to determine if a position estimate obtained from a satellite navigation system is reliable for an intended purpose.

It is still another object of the invention to discern the error bound associated with a vertical position estimate.

It is yet another object of the invention to provide an improved clock-aided satellite navigation system for aviation.

It is still another object of the invention to provide an aircraft with the ability to monitor its position accurately during a precision approach using satellite navigation.

It is a final object of the invention to provide a method for obtaining reliable position estimates during satellite navigation.

These and other objects of the invention are provided by a navigation receiver system, and a related method, for determining and initiating correction of location in real time. The system can include a receiver and a processor. The receiver receives signals representative of range measurements from a plurality of satellites in a satellite navigation system, and it includes a stable clock having a constant frequency drift rate for at least a predetermined period of time. The processor utilizes the constant frequency drift rate and the signals from the satellites to determine a three-dimensional estimate of the position of the receiver.

Also, according to the invention, a navigation receiver system for determining and initiating correction of location in real time is provided. The system includes a movable object moving along a path. A receiver receives signals representative of range measurements from a satellite navigation system. A clock in the receiver has a constant frequency drift rate for at least a predetermined period of time. A processor determines clock bias estimates over the predetermined period of time based on the satellite signals. The processor also determines a smoothed clock bias estimate over the predetermined period of time based on the clock bias estimates, and determines a three-dimensional position estimate of the movable object using the smoothed clock bias estimate at an instantaneous time. The processor compares the smoothed clock bias estimate at the instantaneous time with a clock bias estimate at the instantaneous time and generates a degree of error therebetween. It determines an error associated with the three-dimensional position estimate using the degree of error, and compares the error associated with the three-dimensional position estimate with a predetermined error range associated with the path of the movable object. The processor also determines whether the error associated with the three-dimensional position estimate is within the predetermined error range. The determination of whether the error associated with the three-dimensional position estimate is within the predetermined error range is then provided to the movable object. The location of the movable object is then changed, if necessary, based on this determination.

Satellites in a satellite navigation system such as the Global Positioning System (GPS) transmit signals from which the receiver of the instant invention obtains snapshots of range measurements to the satellites. From such snapshots, the receiver is capable of computing estimates of the corresponding three coordinates of the receiver position, as well as the instantaneous receiver clock bias. The quality of such estimates depends upon the number and the geometry of satellites in view, and the degree of error of the measurements. When navigating with the system of the instant invention, the position of the receiver will change over time. The present receiver clock, instead of changing with time as do clocks in known systems, is predictable. It employs a stable clock. The predictability of the clock is based on improved stability characteristics of the clock.

In the system of the instant invention, position estimates of a movable object are obtained by a receiver within or coupled with the movable object. The receiver clock is stable over at least a predetermined period, as its frequency drift rate is constant. Due to such stability, the bias relative to the satellite system time can be estimated in real time. This estimation is carried out by a quadratic function which estimates, over time, the clock bias with respect to the satellite navigation system. The user obtains a 'smoothed' bias estimate from the quadratic function, enabling the user to use this smoothed clock bias estimate as a predictor of the clock bias for some time ahead. Using the smoothed clock bias estimate, the receiver processing scheme computes the three-dimensional position estimates from the snapshots of range measurements. The processing scheme thus only solves for three variables, thereby reducing the error in the position estimates obtained, particularly the error in the vertical position estimates.

The processing scheme of the instant invention is also used for receiver autonomous integrity monitoring to allow the user of the movable object to determine whether the position estimate is accurate enough for an intended purpose. The smoothed clock bias estimate obtained above, is further compared with the clock bias at an instantaneous time to determine the amount of error associated with the current estimate. By obtaining the size of the error in the clock bias estimate, the processing scheme of the instant invention determines the degree of the error in the vertical position estimate as well as a high-confidence upper bound on the vertical position error. Knowing the degree of error, the system corrects for it either by allowing the movable object to maintain its position along a current path or by causing the movable object to abort its approach.

The system of the instant invention in providing enhanced position estimates, relies on its ability to monitor the receiver clock behavior accurately over time using the GPS measurements. The basic system requirement is that there be no significant, unpredictable change in the clock frequency for a predetermined period; that is, the frequency drift rate is constant for a sufficient amount of time to allow for the clock parameters to be estimated from the GPS measurements. The accuracy of the vertical position estimate obtained from using GPS in a differential mode, local or wide-area, through the use of the short-term stability of the clock, provides a significant decrease in the rms error in the vertical position as compared to known systems.

The system of the instant invention can be adapted for use with the Wide Area Augmentation System (WAAS), however, the invention is not to be limited thereto. Under WAAS, an added assurance on system operation is in the form of an integrity broadcast message indicating that the GPS signals as monitored at a number of geographically distributed reference stations are consistent with a specified model. The broadcast would include corrections to be applied to the measurements by a user in order to compensate in part for the measurement errors. The size of the remaining errors in a user's measurements then depends upon 'age' of the corrections, local interference or multipath at the user and/or the reference station, local atmospheric anomalies, and any avionics errors.

Furthermore, the system of the instant invention executes a receiver autonomous integrity monitoring scheme to provide the user with information to ensure that an aircraft stays within the prescribed airspace, a vital safety concern in civil aviation. The system of the instant invention presents a process for clock-aided integrity monitoring which offers several advantages over current methods as it yields tighter measures of the position integrity. The process is seen as meeting the integrity monitoring requirements of Category I precision approaches executed under differential GPS, local or wide-area, with near-100% availability.

The instant invention overcomes the problems associated with conventional receiver systems, particularly the inaccurate vertical position estimates obtained by such receivers from satellite measurements, by providing a system yielding an improved position estimate as well as a reliable determination using clock aided integrity monitoring to tell the user whether this estimate is good enough for the user's purpose.

The foregoing and other objects, aspects, features, and advantages of the invention will become more apparent from the following descriptions and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 1A shows a scatter plot of the error obtained in a horizontal position estimate of a movable object based on measurements taken from GPS.

FIG. 1B shows a scatter plot of the error obtained in a vertical position estimate of a movable object based on measurements taken from GPS.

FIG. 9 shows an imaginary containment tunnel used for an aircraft with the clock-aided navigation system of the instant invention.

DESCRIPTION

The invention described herein utilizes the following definitions for purposes of clarity: a clock is defined as any mechanism which records, tracks, displays, or in any other manner, accounts for the passage of time, clock bias is defined as the amount by which a clock is recording, tracking, displaying or accounting for time, in relation to another clock, particularly such amount by which one clock is faster than or slower than another clock, frequency drift rate is defined as the rate by which a clock increases or decreases its speed in recording, tracking, displaying or accounting for the passage of time.

The instant invention utilizes clock-aided navigation based on the premise that in estimation of the position and the receiver clock bias from a snapshot of satellite range measurements provided by a satellite navigation system, the errors in the estimates of vertical position and clock bias are highly correlated. If the clock bias estimate has a large error, so does the vertical position estimate, and vice-versa. This premise is exemplified in FIGS. 1A and 1B, which show scatter plots of the errors in the horizontal and vertical position estimates, respectively, versus the error in the corresponding clock bias estimates computed from the GPS measurements snapshots taken 10 seconds apart over a day.

Note, however, in FIG. 1A that there exists no apparent correlation between horizontal error and receiver clock bias error. When the horizontal position error is +50 meters, the clock bias error can be −50 meters. By contrast, FIG. 1B, shows a strong linear correlation between clock bias error and vertical position error. Note that when the error in the clock bias is at a value, such as +50 meters, the error in the vertical position estimate is at roughly the same value of +50 meters. The instant invention utilizes this correlation, as the error in the clock bias estimate from a snapshot of range measurements is a reliable predictor of the error in the corresponding vertical position estimate.

Figure 2A:
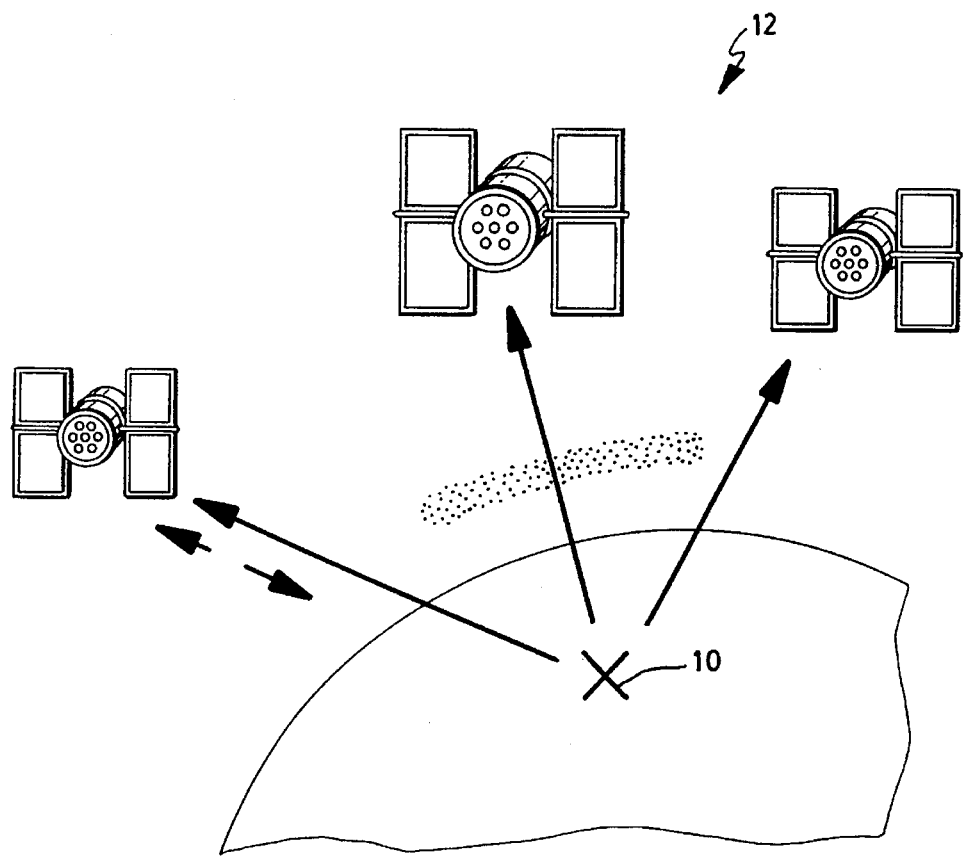
FIG. 2A shows a movable object whose position is being estimated with the aid of satellite navigation.
Figure 2B:
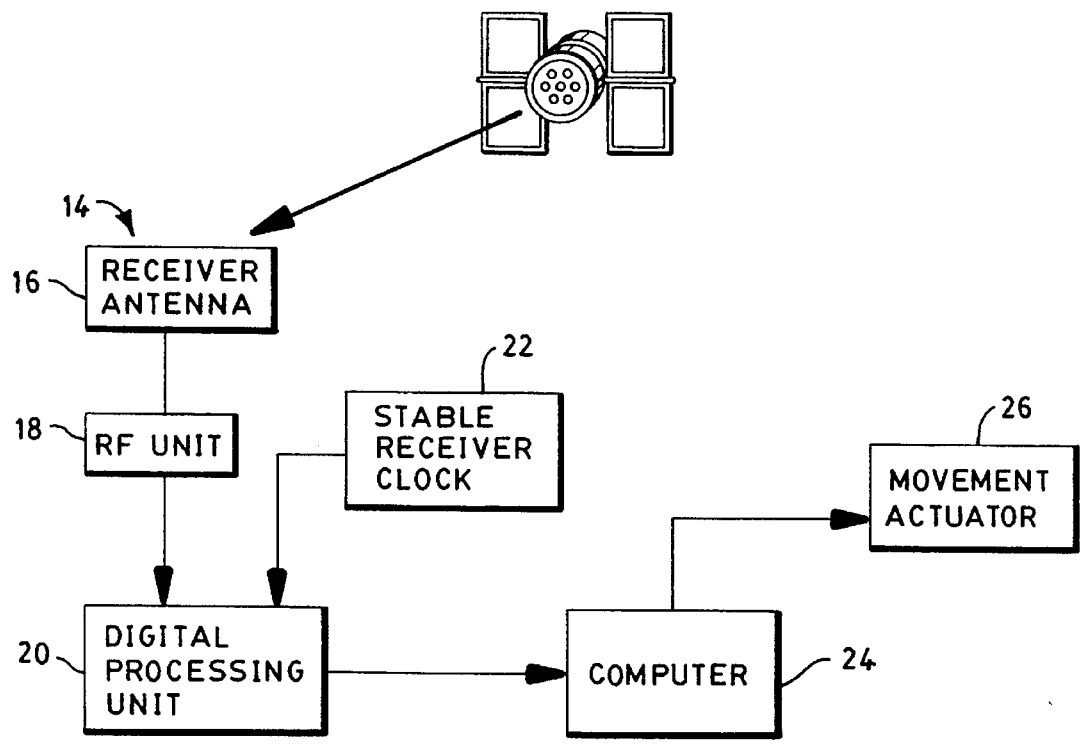
FIG. 2B shows the system requirements of the instant invention.

FIG. 2A shows a movable object 10, the position of which is determined with range measurements provided by a satellite navigation system 12. Within the movable object is the receiver system of the FIG. 2B. It is not essential to the invention that the receiver be within the movable object, as it could be remotely coupled to the movable object if the user desired. FIG. 2B shows the receiver's 14 system requirements of the instant invention. The receiver 14, preferably comprises an antenna 16, and an rf unit 18 through which the signals received from the antenna pass, a digital processing unit 20 (e.g., an analog-to-digital converter) which creates digital signals representing psuedorange measurements. Also connected to the digital processing unit 20 is the stable receiver clock 22 which has a constant frequency drift rate over at least a predetermined period of time. The receiver clock 22 can be represented by a temperature compensated crystal oscillator (TCXO), an oven controlled crystal oscillator (OCXO), or any clock having a constant frequency drift rate over a period of time. After creating signals representing the pseudorange measurements, as well as the clock bias, these signals are sent to a computer 24 where the processing scheme of FIG. 7, to be discussed below, provides the user with enhanced vertical position estimate data as well as a data indicating whether such estimates are of sufficient quality for the user's purpose. The computer 24 typically includes at least a microprocessor, and it generally includes the elements of a central processing unit (CPU). The computer 24 then outputs such data which can be used to change the position of the object 10.

The position of the object 10 can be altered by a movement actuator 26. The actuator 26 can be, for example, a mechanical or electromechanical actuator on an airplane. The computer 24 can directly cause the actuator 26 to move, or alternatively an operator of the movable object 10 can be apprised of the position estimate and the operator can then make an independent determination whether a positional or course change is appropriate.

For example, if the system is used in an aircraft, the knowledge of the three-dimensional position estimate could be used to provide the operator with the ability to know with increased accuracy his position with respect to a flight path. Particularly useful is enhanced vertical position estimate obtained with the system of the instant invention. Provided with such an enhanced position estimate, a pilot could change altitude in response thereto. For example, if during a precision approach, the pilot realizes that he should be at an altitude greater or less than the estimated position, he can either increase or decrease his altitude. Alternatively, if the aircraft was using autopilot, the enhanced vertical position estimate would cause the aircraft to either increase or decrease its altitude automatically.

The correlation between clock bias estimates and vertical position estimates has been found to be true even if one or more of the position range measurements had arbitrary biases. This is further exemplified in FIGS. 3A–3D.

Figure 3A:
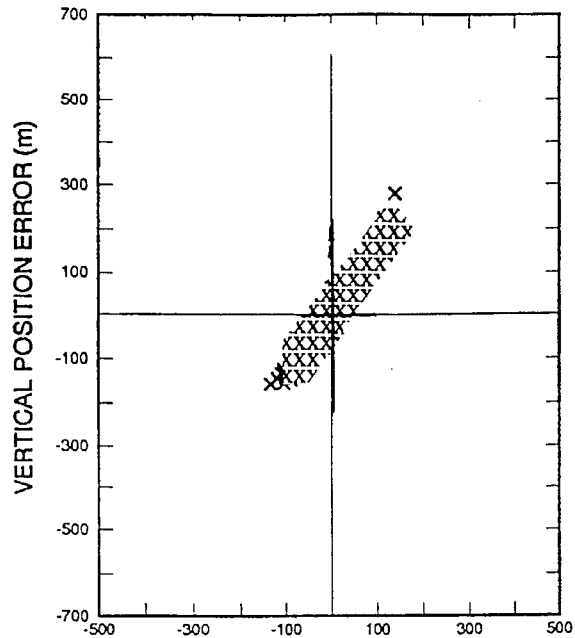
FIGS. 3A–3D are graphical representations of the correlation structure in the estimates of the vertical position and the instantaneous clock bias based on measurements taken from GPS.
Figure 3B:
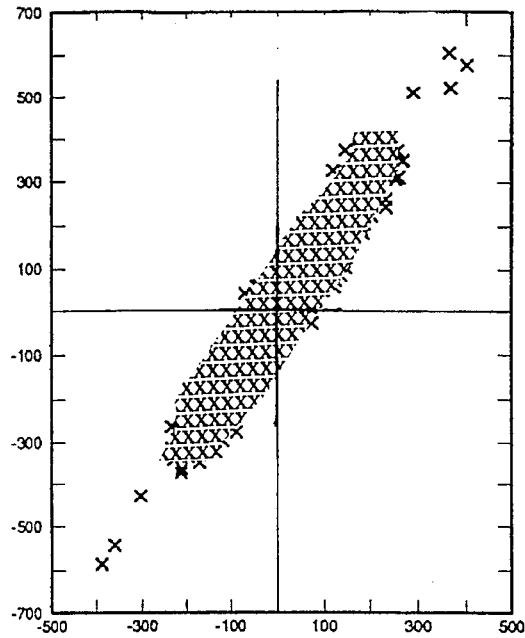
Figure 3C:
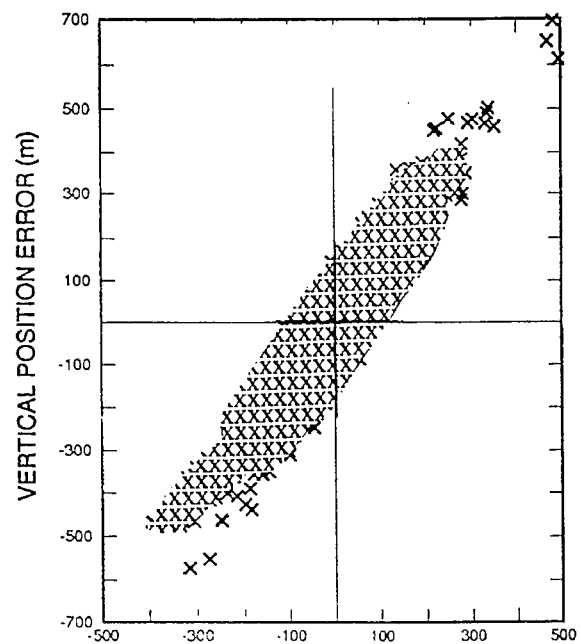
Figure 3D:
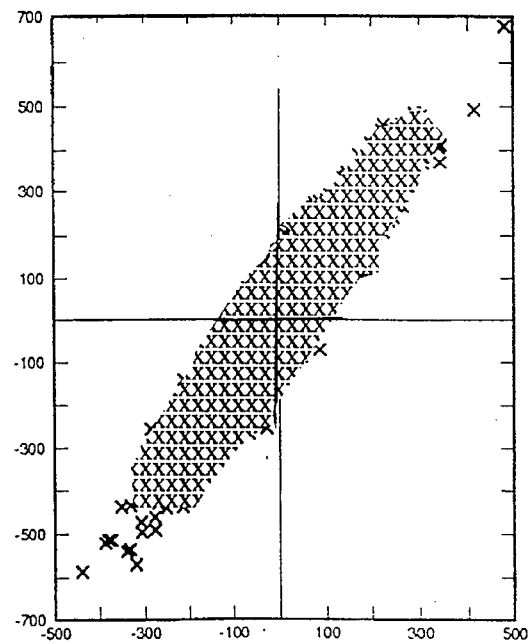

FIG. 3A shows a scatter plot of vertical position error versus clock bias error in 4-D estimates from snapshots of actual GPS range measurements taken one minute apart over a week while 'selective availability' (SA) error was active. 'Selective availability' pertains to the signal degradation introduced by the government to discourage unauthorized use of the satellite navigation system. FIG. 2B shows the corresponding results where a bias has been added to a randomly chosen pseudorange measurement in each snapshot to simulate a satellite anomaly. The bias has been drawn from a zero-mean Gaussian distribution with standard deviation of 100 m. FIGS. 3C and 3D show the results where the similarly drawn biases have been added to two and three measurements per snapshot, to simulate multiple anomalies. Note that as the range measurement biases are increased, the error in the clock bias estimate grows, and the error in the vertical position estimate grows roughly proportionally. Based on these figures the instant invention utilizes a finding that the quality of the vertical position estimate can be obtained in general from the error in the estimate of the receiver clock bias. Moreover, this holds true when no external information is available as to satellite operating conditions, or the presence of anomalies due to system malfunction.

Figure 4:
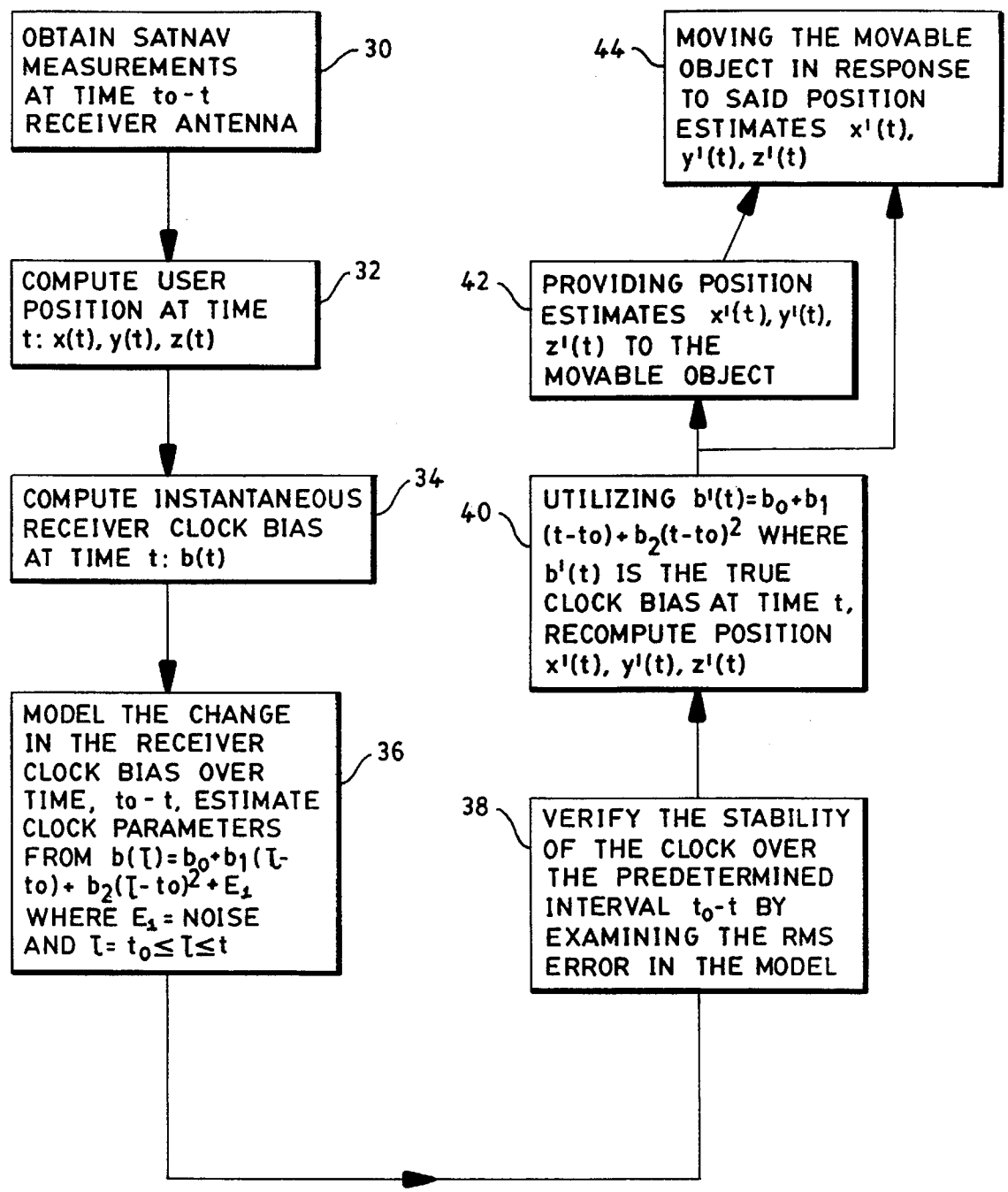
FIG. 4 shows a flow chart implementing the clock aiding receiver system of the instant invention to improve vertical position estimates.

The flow chart of FIG. 4 describes the processing scheme executed by the computer 24 to provide an improved vertical position estimate based on the above-noted correlation between error in the clock bias estimate and that in the vertical position estimate. Initially, as given in step 30, the receiver antenna receives range measurements from time $t_0$ to time t. Time $t_0$ is a time before the instantaneous time t. This is relevant in that the processing scheme provides improved position estimates at time t and beyond, using times $t_0$ through t, to aid in fitting a clock bias model; a discussion of which is relevant to step 36. Looking however, at step 32, the processing scheme computes the user position estimates in three coordinates x,y,z at time t, and at 34, computes the instantaneous receiver clock bias estimate b at time t, by solving for x, y, z, and b in the equations to follow. Given n satellites in view and the position of the ith satellite at time t denoted by $x_i$, $y_i$, $z_i$, where i=1,2,3 . . . n. The measured ranges to the ith satellite is $r_i$. Thus, using the following equation for as many satellites as are in view, eg. up to the ith satellite, the system solves for unknowns x, y, z, and b:

$$\sqrt{(x_i-x)^2+(y_i-y)^2+(z_i-z)^2} = r_i + b.$$

The processor solves this equation by solving for the x, y, z and b at time t, for as many satellites as are in view, that is, up to the ith satellite. Given that satellites are constantly moving to and out of view, the number of satellites providing range measurements are a plurality, preferably greater than three. Note that t is the time interval during which clock bias is modeled for use in determining the three-dimensional position estimates. It is also important to note that the stability of the clock is relevant to determining how long the interval $t_0$ to t should be. Hypothetically, if the clock used has a constant frequency drift rate for a maximum of one hour, the interval $t_0$ to t should be less than or equal to one hour.

Once the instantaneous receiver clock bias b(t) is known, the processing scheme models the receiver clock bias over time from $t_0$ to t, in step 36, so that smoothed estimates of clock bias can be obtained for that time period, thereby eliminating the need to later solve for clock bias, reducing the equation above to only three unknowns x, y, and z. To explain this step in greater detail, the system of the invention utilizes the premise that the rms error in the clock bias estimate based upon a single snapshot of the pseudorange measurements is given by:

$$\sigma_b = \sigma_{URE} \cdot \text{TDOP}.$$

where $\sigma_{URE}$, is the rms error in the GPS range measurements, and TDOP is the time dilution of precision parameter reflecting the satellite geometry. In the presence of selective availability (SA), $\sigma_{URE}$, has remained at about 25 m over the past two years. For the constellations of interest, TDOP typically ranges between 0.75 and 1.25.

Taking a typical value of 1 for TDOP in our simple calculations below, the rms error in clock bias estimated from a single snapshot of the range measurements is given by:

$$\sigma_b \approx \sigma_{URE} \approx 25 \, m.$$

The system of the instant invention obtains GPS measurements over a time period ($t_0$, t) during which the receiver clock is known to be stable, and models the clock bias at time t simply, as the quadratic function which appears at 36;

$$b(t)=b_0+b_1(t-t_0)+b_2(t-t_0)^2,$$

and estimates parameters $b_0, b_1$, and $b_2$ from the available measurements. Given k statistically independent measurement snapshots, the rms error in the clock bias estimate will be $\sigma_b \approx \sigma_{URE}/\sqrt{k}$. The number of independent measurement snapshots obtained from GPS in an hour depends upon the correlation time of the measurements.

In differential mode, the effects of both selective availability (SA) and the ionosphere are substantially undone, the system of the instant invention implements the processing scheme whereby the number of independent measurements increases due to reduced correlation time (say, 1 minute). The differential corrections improve the quality of the range measurements. Denoting the residual error as the user differential range error (UDRE), $\sigma_{UDRE} \approx 3$ m is realistic TDOP is unchanged. As above, the rms error in clock bias estimated from a single snapshot of the differentially-corrected range measurements, $\sigma_{UDRE} \approx 3$ m. Given, say, 1-minute measurement samples over an hour, this is provided by: $\sigma_b \approx \sigma_{URE}/\sqrt{k}$, which, based on the above calculations appears as; $\approx 3/\sqrt{60} \approx 0.4$ m. Note, however that the clock model parameters can be estimated both more accurately and more quickly in differential mode.

The system's provision for clock modeling can thus accommodate a shorter-term stability in differential mode than in the mode where no differential corrections are available. At the conclusion of this step, the processing scheme adaptively derives clock bias estimates in a quadratic function. The quadratic function, yielding a least square fit of b(T) where T is greater than or equal to t0, and less than or equal to t, is used to define b'(t) which is a more accurate estimate of the clock bias, at time t, to be further discussed in step 40. After obtaining a least square fit, step 38 verifies the stability of the clock over the predetermined interval in which the GPS measurements were provided. This is carried out by examining the rms residual error in the model obtained in step 36. If this condition is met, a more precise estimate of the user position can be recomputed in step 40 from a snapshot of the GPS range measurements via 3-D estimation.

At step 40, a true clock bias is given by b'(t) and solved for instantaneous time t, by taking the smoothed clock bias estimate from the values provided by the least square fit, which is the true instantaneous clock bias. Position estimates x'(t), y'(t), z'(t) are now recomputed with this more accurate clock bias estimate z'(t), as a given, to provide improved position estimates. This estimation is a 3-D estimation, as now there are only three unknowns, now that the clock bias estimate is given from the least square fit.

Once these estimates are recomputed, they are transmitted to a user, as shown in step 42, or to the movement actuator 26, as indicated in step 44. Similarly, a user can transmit these enhanced position estimates to a movable object after first obtaining the knowledge indicated in step 42. The above processing scheme carries out receiver clock aided navigation to provide improved three-dimensional position estimate, the effects of the improvement particularly shown in the degree of error associated with the vertical position estimate.

Figure 5:
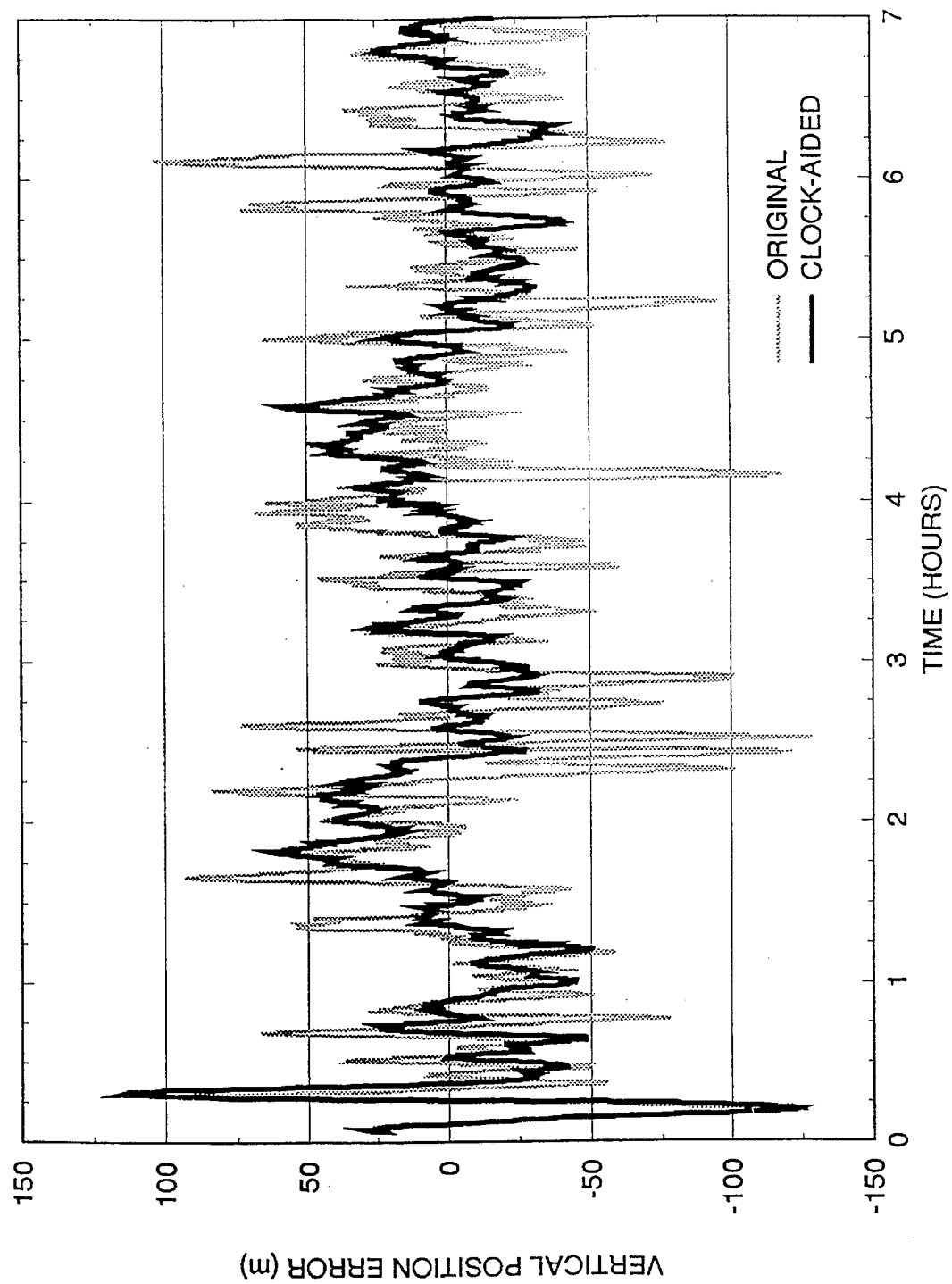
FIG. 5 shows a graphical representation of the vertical position estimates obtained from GPS measurements using the clock-aiding system of the instant invention, and the vertical position estimates without the clock-aided system.

FIG. 5 provides a graphical representation of the vertical position estimates obtained from GPS measurements using the clock aided navigation of the instant invention, versus the vertical position estimates obtained from GPS measurements without it. This figure shows the vertical position estimates obtained from the GPS measurements over a six-hour period. The error in vertical position estimates obtained from 4-D estimation snapshot by snapshot are shown as 'original' and demonstrate a high degree of error. These are to be compared with the vertical position estimate obtained from 3-D estimation shown as 'clock-aided' carried out by the instant invention where we have used the estimates of clock bias derived adaptively from the measurements over an hour. As shown, obtaining position estimates using the receiver clock bias offers a distinct improvement, as the clock-aided navigation in 3-D avoids the peak errors obtained with 4-D estimation alone. Note that the rms error is cut nearly in half, noted by 38 m versus 22-m. Although this figure shows an original and clock-aided waveform as being similar waveforms in about the first half-hour, note that this is due to a cold receiver start-up. The initial transients in clock-aided position estimates last about 30 minutes while the clock model parameters $b_0, b_1$, and $b_2$ are not estimated well enough to offer any improvement in performance.

Figure 6A:
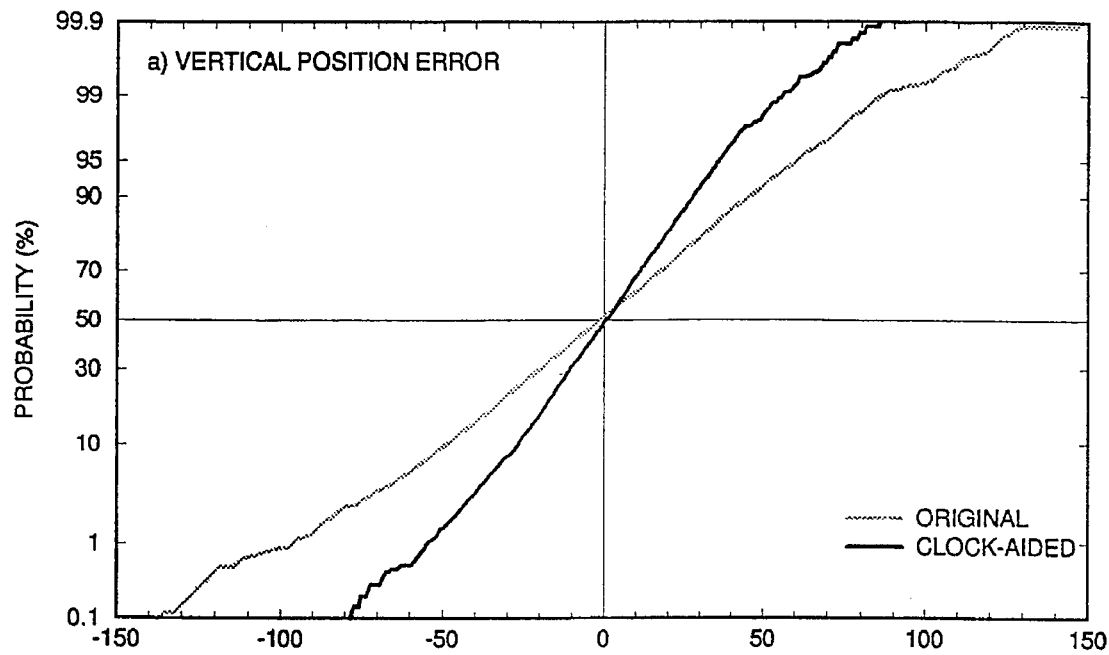
FIG. 6A shows a graphical representation of the benefits obtained in the form of a cumulative probability distribution functions of the horizontal position errors in the estimates obtained from GPS with clock-aiding and without clock-aiding.
Figure 6B:
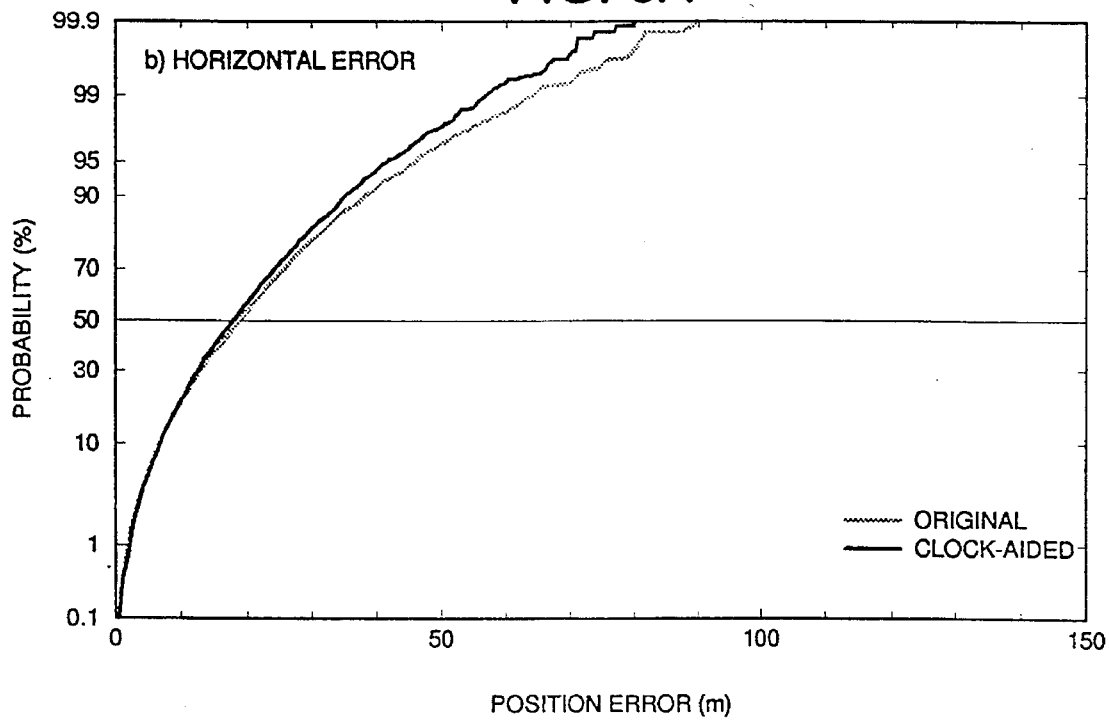
FIG. 6B shows a graphical representation of the benefits obtained in the form of a cumulative probability distribution functions of the vertical position errors in the estimates obtained from GPS with clock-aiding and without clock-aiding.

FIGS. 6A and 6B show the cumulative distribution functions of position errors in snapshot-by-snapshot and the clock-aided estimation from 3-minute samples of GPS measurements over a week. As shown in these figures clock aiding offers a sharp improvement in the vertical position estimates, but relatively little change in the horizontal position estimates. Note that in FIG. 6A, 99% of the users of conventional receiver navigation systems will obtain an position error of 150 meters. However, 99% of the users of the clock aided system of the instant invention sampled over a week period, obtained a position error of 80 meters. Thus it is evident that the vertical position estimates are greatly improved both in terms of the rms error and the curtailment of the tails. The improvement in the probability of obtaining more accurate vertical position measurements is particularly important in view of the fact that the accuracy requirements in civil aviation are generally stated in terms of the tails of the error distributions. With respect to the horizontal position estimates, there is slight improvement, with 99% of the users of conventional receiver navigation systems obtaining a position error of 90 meters, as opposed to the 99% of users of the clock-aided system of the instant invention obtaining a position error of 80 meters.

From the above discussion it is evident that the clock aided navigation system of the instant invention enhances the likelihood of the user having more exact knowledge of the vertical position of the movable object.

Figure 7:
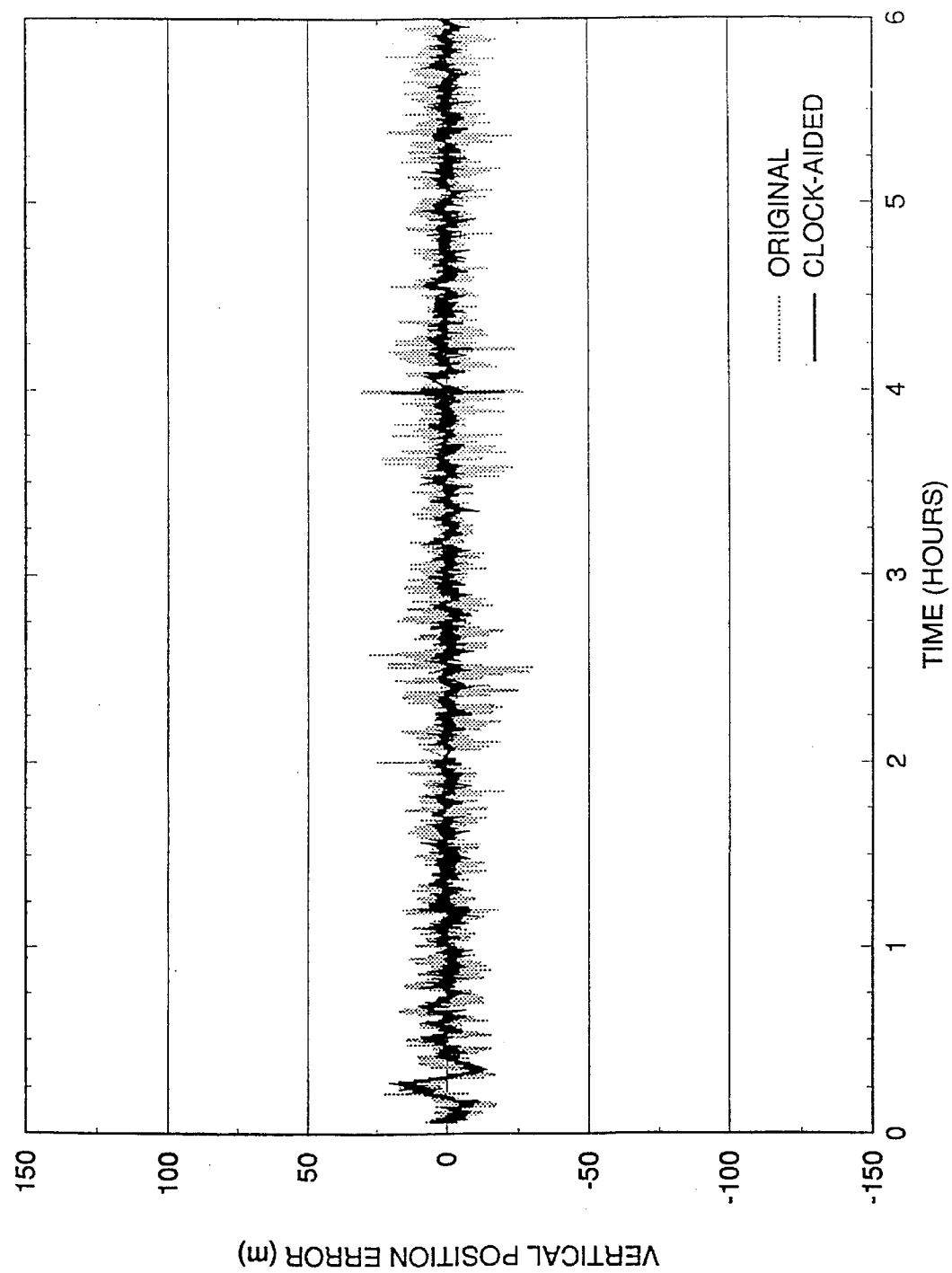
FIG. 7 shows a graphical representation of the vertical position estimates obtained from actual GPS measurements in differential mode using clock-aiding and without clock-aiding.

FIG. 7 exhibits the vertical position estimates computed snapshot by snapshot obtained by the system using the differential mode as discussed above, with and without clock aiding to demonstrate the improvement in position estimates. The measurements consist of 12-second samples of pseudorange snapshots. Again, clock aiding with the instant invention is seen to offer a distinct improvement in the quality of the vertical position estimates. Note also in this figure the initial transients resulting from a cold start of the receiver. The duration of the transients are much shorter than the transients of FIG. 7, as they last only about 15 minutes. This figure further evidences the fact that the clock parameters are learned by the processing scheme in step 36, in the differential mode, using the quality of the measurements and shorter correlation times.

Turning now to the implementation of the invention to civil aviation, the accuracy requirements mandated for certain flight approaches are very stringent. For example, the accuracy requirements for Category I approaches can be stated as follows:

(i) P(vertical position error<10 m)>0.95

(ii) P (vertical position error>20 m and Receiver Autonomous Integrity Monitoring fails to detect<$10^7$ These requirements specify the quality of vertical position estimates at the decision height of 200 feet. The first relates to the accuracy provided by the receiver in general and the second deals specifically with each position estimate accepted for navigation. We will refer to these as the accuracy requirement and the integrity monitoring requirement, respectively. The integrity monitoring requirement will be discussed in greater detail in FIG. 8. Note, however that the clock-aided vertical position estimates in FIG. 7 satisfy the accuracy requirement cited above for Category 1 standards, as discussed above.

The above discussion has focused on the system of the instant invention and its applicability for clock aided navigation. Now we will discuss the system of the instant invention and its further applicability for receiver autonomous integrity monitoring. As mentioned briefly this requirement is to assure, through integrity monitoring that an aircraft stays within the prescribed airspace. The focus in our discussion thus shifts from a point estimate of the position, as discussed above, to a region within which the aircraft is sure to be. As expected, the prescribed airspace gets increasingly tighter as the aircraft approaches the runway. As the system enhances the quality of vertical position estimates, our discussion will be limited to vertical position, or altitude. Through integrity monitoring, the system of the instant invention determines an interval which includes the user altitude by estimating such an interval via the correlation structure of the 4-D estimates. If the altitude or vertical position, estimate falls within this interval, and the length of the interval is consistent with the position uncertainty allowed under the receiver autonomous integrity monitoring requirements, the approach can proceed. If it is concluded that the requirement is not met, the approach is to be aborted.

Figure 8:
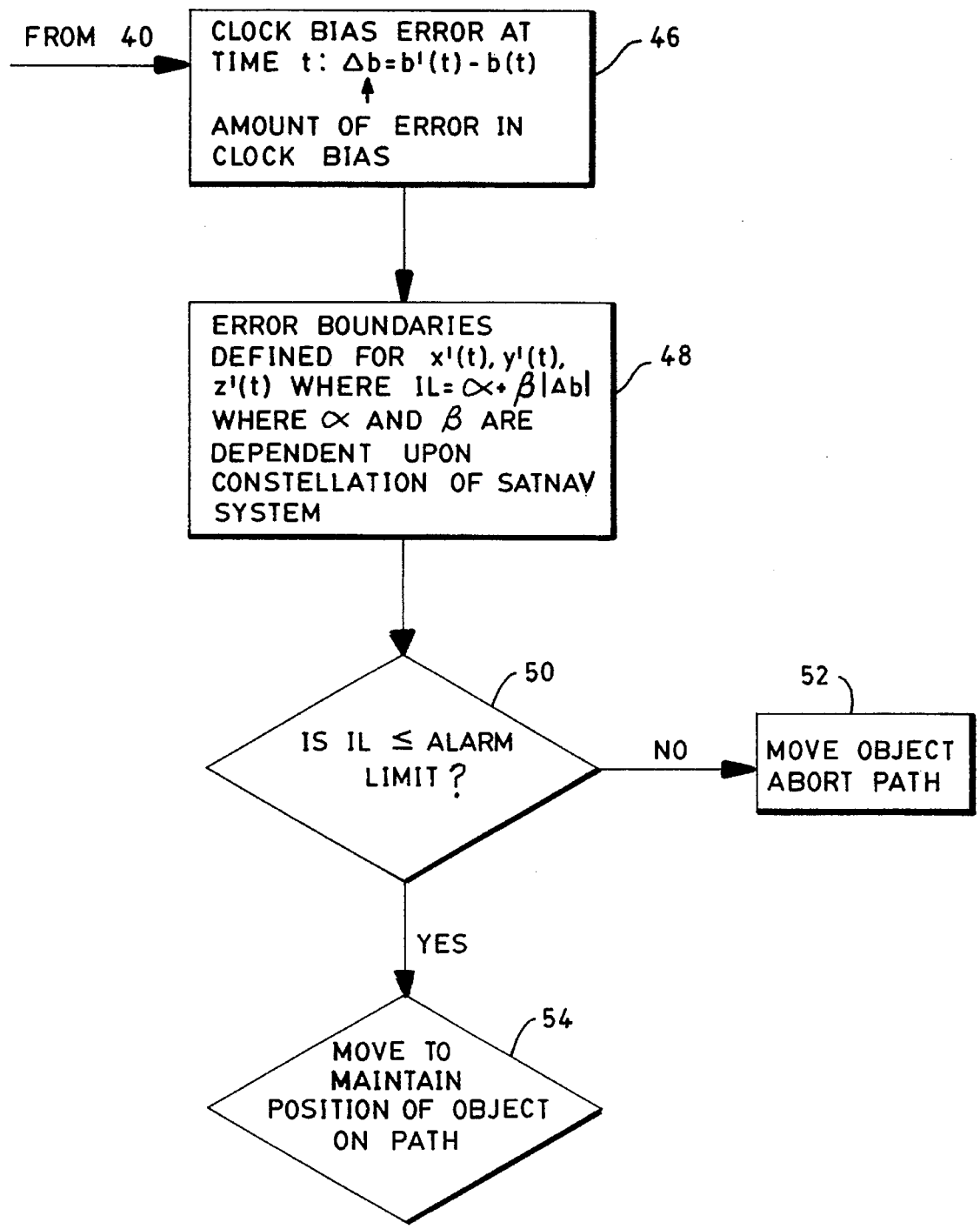
FIG. 8 shows an operational flow chart of the processing scheme for carrying out clock aiding to obtain a position estimate and a measure of its quality.

Looking to the flow chart of FIG. 8, note that the processing scheme picks up from step 40 of FIG. 4. Thus, given that the receiver clock is stable over a predetermined interval t0-t, b is obtained by adaptive estimation of the clock parameters over time, as discussed in step 36, and position estimates at instantaneous time t can be recomputed in step 40. As shown in FIG. 8, step 46 takes the smoothed clock bias value at time t and determines any discrepancy between this value and the value estimated from the current snapshot obtained from the satellite navigation system. The discrepancy reflects the error in the clock bias estimate, which is likely due to current satellite geometry, measurement errors, and any other anomalies.

As applicant's have determined the strong correlation between the clock bias error and the vertical position error, this discrepancy is related to the error in the snapshot-based vertical position estimate. Thus, the determination of the clock bias error can be used to define a high confidence bound for the vertical position error. Next at step 48, the processing scheme defines an error boundary on the vertical position error in the values of x'(t), y'(t) and z'(t) as obtained in step 40 of FIG. 4, or in x(t), y(t), z(t) as obtained in step 32.

This boundary is the Integrity Level (IL) associated with the vertical position estimate, and is defined by:

$$IL = \alpha + \beta |\Delta b(t)| \text{ meters}$$

where IL is the computed Integrity Level with the actual position error and $\alpha$ and $\beta$ are parameters whose values depend upon the number of satellites, the geographical position of such satellites and the rms range of error in the measurements are computed for a particular GPS constellation. These values are obtained either by simulating or obtaining actual range measurements which are used to generate the correlation structure between the receiver clock bias error and the position estimates, particularly as shown in FIGS. 1A and 1B. For example, using a 24 GPS satellite constellation, these parameters for WAAS are defined as $\alpha=10$ meters and $\beta=1.4$ meters.

With respect to $|\Delta b(t)|$, this represents the absolute value of an accurate estimate of the instantaneous clock bias error. If the integrity level is greater than the alarm limit, as in step 50 then the user and/or the movable object is notified to abort the approach as given by step 52 due to the deviation of the movable object from the permissible boundaries which define the alarm limit. The movable object particularly if on autopilot, would receive such information regarding the deviation and in turn, change its course of direction automatically in response thereto, simply by moving out of, or away from the path in which it is traveling. Alternatively, in the event that the integrity level is less than the alarm limit, the object may continue to maintain its position on the path as given in step 54.

Referring to FIG. 9, the system can be implemented to provide receiver autonomous integrity monitoring for a category I approach. In accordance with the concept of Required Navigation Performance (RNP), the overall performance requirements for each phase of flight would be specified in terms of two surfaces or, tunnels, 50, 52, defined around the flight path 60 constructed by joining the waypoints known to the airborne system. For purposes of example only, this discussion focuses on Category I approaches.

As stated above, RNP mandates the use of an imaginary inner tunnel to define a region around the approach path where the navigation center of the aircraft must be 95% of the time. A caution may be required if the estimated position of the center of navigation of the aircraft violates the inner tunnel dimensions. The outer tunnel represent a containment surface that no part of the aircraft may breach without a warning being provided to the pilot.

The dimensions of tunnels 50, 52 vary with the altitude, thus the tunnels become narrower as the aircraft approaches the runway 62. Category I approaches currently require navigational guidance down to a decision height (DH) of 200 feet. The proposed dimensions of the inner and the outer tunnels corresponding to this decision height, are the tightest to be encountered during a Cat I approach. As integrity monitoring carried out by the system protects against undetected violation of the containment surface, with receiver autonomous integrity monitoring, an alarm is to be made on the basis of an estimate of the total system error (TSE), defined as deviation of the aircraft from the defined flight path. The dimensions associated with the outer tunnel as the TSE alarm limits.

For an aircraft not to breach the containment tunnel:

Total system error (TSE)=flight technical error (FTE)+navigation sensor error (NSE), ≦outer tunnel dimension–aircraft dimension.

An aircraft with a smaller FTE can tolerate a larger navigation error, and vice versa. This trade off is cited as an important benefit of the RNP concept, as RNP allows for an aircraft to adapt to the requirements of the airspace in terms of equipage and pilot skills, rather than the airspace to be adapted to the least-capable aircraft. For an aircraft with a semi-span of 110' and height of 20', the TSE alarm limits at the DH of 200' roughly are 96 m laterally and 27 m vertically. Obviously, an aircraft indicated by the navigation sensor to be following the predefined flight path exactly can tolerate an NSE of 96 m laterally and 27 m vertically without fear of violating the containment surface. On the other hand, for another aircraft, indicated to be barely within the inner tunnel, the permissible margin of navigation error will be smaller: 62 m laterally and 17 in vertically. An aircraft indicated to be flying outside the inner tunnel will have a smaller margin of tolerable error yet. The maximum permissible error in a position estimate is known as the user's NSE alarm limit. The system of the instant invention is thus capable of proving applications for integrity monitoring of the NSE alarm limit, given the FTE and the tunnel dimension, to ensures that the position error does not exceed this limit. If it does, the approach is to be aborted.

Under the RNP concept, the NSE alarm limit varies from aircraft to aircraft, pilot to pilot, and situation to situation. As noted earlier, the tunnels are at their narrowest at the DH, and the NSE alarm limits at its most stringent, and at earlier instants during the approach, both TSE and NSE alarm limits are larger. As noted earlier, the requirement on probability of undetected violations of the containment tunnel is specified on a 'per approach' basis. This probability will be allocated appropriately along the approach path to obtain the probability of undetected violation on a 'per sample' basis. With navigational guidance from WAAS, a pilot following the flight path closely could be virtually assured of meeting the integrity requirements of Category 1. However, a pilot with a significant FTE if the aircraft is on the edge of the inner tunnel may have to abort the approach, execute a go-around, and try again with better control of the airplane.

Variations, modifications, and other implementations of what is described herein will occur to those of ordinary skill in the art without departing from the spirit and scope of the invention as claimed. Accordingly, the invention is to be defined not by the preceding illustrative description but instead by the following claims.

What is claimed is:

1. A navigation receiver system, comprising:

a receiver for receiving signals representative of range measurements from a plurality of satellites in a satellite navigation system, said receiver comprising a stable clock having a constant frequency drift rate for at least a predetermined period of time; and a processor in signal communication with said receiver for: (i) generating a model of a bias associated with said clock over said predetermined period of time utilizing said constant frequency drift rate, (ii) determining a clock bias estimate using said model, and (iii) using said clock bias estimate and said signals from said plurality of satellites to determine a three-dimensional estimate of the position of said receiver.

2. A method for determining position using a satellite navigation receiver system, comprising:

providing a receiver comprising a stable clock having a constant frequency drift rate for at least a predetermined period of time;

providing a processor in signal communication with said receiver;

receiving, at said receiver, signals representative of range measurements from a plurality of satellites of a satellite navigation system;

utilizing said constant frequency drift rate to generate a predicted clock bias estimate; and utilizing the predicted clock bias estimate and said signals from the plurality of satellites to determine a three-dimensional estimate of the position of said receiver.

3. A navigation receiver system, comprising:

a movable object;

a receiver coupled to said movable object for receiving signals representative of range measurements from a plurality of satellites of a satellite navigation system, said receiver comprising a stable clock having a constant frequency drift rate for at least a predetermined period of time; and a processor in signal communication with said receiver for processing said constant frequency drift rate to generate a predicted clock bias estimate within said predetermined period of time and a three-dimensional estimate of the position of said receiver using said predicted clock bias estimate and said signals from said plurality of satellites.

4. The navigation receiver system of claim 3, wherein said processor further generates a model of a bias associated with said clock over said predetermined period of time.

5. The navigation receiver system of claim 4, wherein said model comprises a quadratic function.

6. The navigation receiver system of claim 4, wherein said processor uses said model to generate said predicted clock bias estimate at an instantaneous time.

7. The navigation receiver system of claim 6, wherein said processor determines a clock bias estimate at said instantaneous time without the aid of said model.

8. The navigation receiver system of claim 7, said processor further comparing said clock bias estimate at said instantaneous time with said predicted clock bias estimate at said instantaneous time, and generating a degree of error therebetween.

9. The navigation receiver system of claim 8, said processor further determining an error associated with said three-dimensional position estimate using said degree of error.

10. The navigation receiver system of claim 9, said processor further comparing said error with a predetermined error range associated with a path of said movable object, and determining whether said error associated with said three-dimensional position estimate is within said predetermined error range.

11. The navigation receiver system of claim 10, said processor further signaling an actuator for maintaining said movable object on the path.

12. The navigation receiver system of claim 11, wherein said actuator further comprises means for causing said movable object to deviate from the path.

13. A navigation receiver system in communication with a movable object moving along a path and a satellite navigation system, said navigation receiver system comprising:

a receiver for receiving signals representative of range measurements from the satellite navigation system;

a clock having a constant frequency drift rate for at least a predetermined period of time;

a processor for: (i) determining a plurality of clock bias estimates over said predetermined period of time and until an instantaneous time based on said signals, (ii) generating a model of the clock bias using said constant frequency drift rate over said predetermined period of time and until said instantaneous time, (iii) using said model to determine a plurality of predicted clock bias estimates over said predetermined period of time and until said instantaneous time, and (iv) determining a three-dimensional estimate of the position of the movable object using one of said predicted clock bias estimates at said instantaneous time; and an actuator for changing the location of the movable object based on said three-dimensional estimate.

14. The navigation receiver system of claim 13, wherein said model for determining said plurality of predicted clock bias estimates comprises a quadratic function.

15. The navigation receiver system of claim 13, wherein said processor further compares said one predicted clock bias estimate at said instantaneous time with a measured clock bias estimate at said instantaneous time and generates a degree of error therebetween.

16. The navigation receiver system of claim 15, wherein said processor further determines an error associated with said three-dimensional position estimate using said degree of error.

17. The navigation receiver system of claim 16, wherein said processor further compares said error with a predetermined error range associated with the path of the movable object, and determines whether said error is within said predetermined error range.

18. The navigation receiver system of claim 13, wherein said actuator further comprises means for maintaining the movable object on the path.

19. The navigation receiver system of claim 13, wherein said actuator further comprises means for causing the movable object to deviate from the path.

20. A navigation receiver system for determining and initiating correction of location in real time, comprising:

a movable object moving along a path;

a receiver coupled to said movable object for receiving signals representative of range measurements from a satellite navigation system;

a clock, coupled to said receiver, having a constant frequency drift rate for at least a predetermined period of time; and a processor in signal communication with said receiver for:

(i) determining a model of bias associated with said clock using said constant frequency drift rate over said predetermined period of time and until an instantaneous time using a quadratic function, (ii) determining a plurality of predicted clock bias estimates over said predetermined period of time and until said instantaneous time using said model, (iii) determining a three-dimensional position estimate of said movable object using one of said predicted clock bias estimates at said instantaneous time, (iv) measuring without the aid of the model, a clock bias estimate at said instantaneous time, (v) comparing said one predicted clock bias estimate at said instantaneous time with said measured clock bias estimate at said instantaneous time and generating a degree of error therebetween, (vi) determining an error in said three-dimensional position estimate using said degree of error, (vii) determining whether said error in said three-dimensional position estimate is within a predetermined error range associated with said path of said movable object, and (viii) changing the location of said movable object when said error is outside of said predetermined error range.

21. A method of using a clock-aided navigation system, comprising:

providing a movable object moving along a path, a receiver coupled to said movable object, and a clock, coupled to said receiver, having a constant frequency drift rate for at least a predetermined period of time;

receiving signals representative of range measurements from a satellite navigation system;

predicting clock bias estimates over said predetermined period of time until an instantaneous time using said signals and said constant frequency drift rate; and performing a three-dimensional estimation to obtain a position estimate of said movable object using one of said predicted clock bias estimates at said instantaneous time.

22. The method of claim 21, further comprising:

measuring a clock bias estimate at said instantaneous time;

comparing said one predicted clock bias estimate at said instantaneous time with said measured clock bias estimate at said instantaneous time and generating a degree of error therebetween;

determining an error associated with said three-dimensional estimation using said degree of error;

comparing said error with a predetermined error range associated with said path of said movable object;

determining whether said error is within said predetermined error range;

providing, to said movable object, a determination of whether said error is within said predetermined error range; and changing the location of said movable object when said error is outside of said predetermined error range.

* * * * *

UNITED STATES PATENT AND TRADEMARK OFFICE
CERTIFICATE OF CORRECTION

PATENT NO. : 5,623,414
DATED      : April 22, 1997
INVENTOR(S) : Misra, Pratap N.

It is certified that error appears in the above-indentified patent and that said Letters Patent is hereby corrected as shown below:

Title page, item [73], Assignee: should read-- Nassacgysetts Institute of Technology--.

Signed and Sealed this

Eighteenth Day of November 1997

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,623,414

DATED : April 22, 1997

INVENTOR(S) : Pratap N. Misra

It is certified that error appears in the above-identified patent and that said Letters Patent is hereby corrected as shown below:

Title page, item [73], Assignee: should read -- Massachusetts Institute of Technology--.

This certificate supersedes Certificate of Correction issued November 18, 1997.

Signed and Sealed this

Fourth Day of August, 1998

Attest:

BRUCE LEHMAN

*Attesting Officer*  *Commissioner of Patents and Trademarks*